United States Patent [19]

Ohtsuki et al.

[11] 4,358,493
[45] Nov. 9, 1982

[54] CANS

[75] Inventors: Akira Ohtsuki; Hirokichi Ishino; Hiromu Sakai; Takahiko Yamasoba; Susumu Tsuchiko; Yasuyuki Ishiwatari; Atsuhiro Yamamoto, all of Kyobashi, Japan

[73] Assignee: Toyo Ink Manufacturing Co., Ltd., Tokyo, Japan

[21] Appl. No.: 229,407

[22] Filed: Jan. 29, 1981

[51] Int. Cl.³ .................... B65D 7/00; B32B 7/02; C09J 7/02
[52] U.S. Cl. .......................... 428/35; 156/218; 156/334; 428/215; 428/220; 428/343; 428/344; 428/354; 428/355; 428/356; 428/461; 428/464; 428/476.3; 428/511
[58] Field of Search .............. 428/35, 354, 349, 343, 428/344, 355, 356, 215, 220, 461, 476.3, 464, 511; 156/331.9, 334, 218

[56] References Cited
U.S. PATENT DOCUMENTS

| | | | |
|---|---|---|---|
| 3,829,340 | 8/1974 | Dembiak et al. | 156/218 X |
| 3,912,568 | 10/1975 | Ueno et al. | 156/218 X |
| 3,921,847 | 11/1975 | Rentmeester | 156/218 X |
| 3,976,724 | 8/1976 | Frank | 428/344 X |
| 4,034,132 | 7/1977 | Manuel | 156/218 X |
| 4,143,790 | 3/1979 | Ueno et al. | 428/35 X |
| 4,173,669 | 11/1979 | Ashida et al. | 428/35 |
| 4,257,536 | 3/1981 | Hilmar | 428/35 X |
| 4,282,276 | 8/1981 | Smith | 428/35 |
| 4,284,672 | 8/1981 | Stillman | 428/35 |

Primary Examiner—Thomas J. Herbert, Jr.
Attorney, Agent, or Firm—Jordan and Hamburg

[57] ABSTRACT

Cans prepared by bonding and/or seaming together the to-be-bonded portions of can materials with the aid of an adhesive, characterized in that the adhesive comprises at least one modified polyolefin selected from carboxyl group-containing polyolefins and metal compound-incorporated carboxyl group-containing polyolefins.

15 Claims, 4 Drawing Figures

CANS

This invention relates to cans prepared by bonding or putting can materials together with an adhesive which will exhibit excellent adhesiveness, sealability, impact resistance, sanitary and like properties when applied.

The greater part of cans which have heretofore been used are those in which solder is used as the adhesive. This is because solder has many advantages that it may be easily handled in bonding operations, is excellent in bond strength and sealability and is resistant to erosion by the contents in a solder sealed can. On the other hand, solder has many disadvantages which are illustrated by the facts that it will adhere only to tin-plate sheets and not to other can materials such as chromium-plated steel sheets, chemically treated steel sheets and aluminum sheets, that it requires the step of washing it with water to prevent the solder sealed can from being corroded due to the flux remaining on the solder, that it results in letting solder sealed cans lack in attractive appearance since the soldered portion is not printable, that it will necessarily raise problems as to lead poisoning during a solder sealing operation and that it has flux attached thereto which will evolve flux vapor during the solder sealing operation thereby corroding the apparatuses in a solder sealed can making factory.

For this reason, various studies have hitherto been made in an attempt to prepare cans in which a suitable adhesive other than solder is used as such. For example, there have been proposed cans prepared by welding can materials or using Nylon 12 or the like as the adhesive (which is a side seam cement in this case). However, such welded cans cannot be produced at a high rate as compared with the solder sealed cans while the polyamide adhesive of such polyamide-bonded cans is apt to be attacked by certain solvents. Further, if the polyamide is used as the adhesive in the preparation of 18-liter cans or the like, the cans or the like so prepared would not necessarily exhibit sufficient resistance to corrosion in cases where they hold highly corrosive contents. Cans prepared using an aqueous emulsion as the adhesive have also be proposed, however, the use thereof is limited depending on the kind of material to be contained in the cans since a surface-active agent is usually used in the preparation of the emulsion. Studies have been made in attempts to find methods for preparing aqueous emulsions without the use of a surface-active agent, however, the methods found up to now are disadvantageous in that the aqueous emulsions cannot necessarily be easily produced thereby.

In addition, in view of corrosion resistance, there have been used cans having their inner side lined with a satisfactorily corrosion resistant resin layer made of polyethylene or the like. In the preparation of these cans, can materials previously covered or laminated on at least one side thereof with polyethylene or the like are bonded together with a resin adhesive since they cannot be bonded together with a metallic solder or the like. However, polyethylene and the like have poor adhesiveness and conventional adhesives such as polyamide will not provide strong bond strength.

Cans are prepared by bonding a can bottom or a can bottom and cover to a corresponding can body made by side seaming the to-be-bonded portions of a sheet-like can body blank with aid of an adhesive. More particularly, a bottom obtained by punching is curled at its periphery by a curl forming machine, an adhesive which is called a sealing compound (can end cement) in this case is applied to the thus curled portion of the bottom, the thus applied adhesive is dried and the bottom so treated is then bonded to the can body by seaming to form an open top can which is heated for a short time to re-melt the sealing compound. The sealing compound used is to keep the resulting can air-tight. The open top can is filled with a desired material and then sealed with a cover with aid of the sealing compound to obtain a canned product.

Although sealing compounds of a rubber type have been mainly used for the airtightness purpose, they are unsuitable for use in the preparation of 18-liter cans since they are unsatisfactory in solvent resistance. When the rubber type sealing compounds are applied with a spray, sealing compounds are apt to deposit onto the nozzle portion of the spray from the sealing compounds whereby the application operation is not conveniently carried out, this being disadvantageous.

An object of this invention is to provide new cans which are excellent in contents resistance, sealability, corrosion resistance, printability and the like.

There have recently been proposed semi-rigid cans prepared from a laminate of a metal foil with a plastics film or paper. The semi-rigid cans so proposed are highlighted since they may be easily collapsed and burnt up after they have been used up. The semi-rigid cans are particularly required to have higher compression resistance and impact resistance and very often raise problems as to especially the bonded portions of the cans. On the other hand, the present invention contemplates the provision of cans having excellent compression resistance and impact resistance.

The can materials used in the production of cans of this invention are those for can body blanks, can covers and can bottoms. They may widely include iron or steel sheets, aluminum sheets, iron or steel sheets plated with zinc, tin, chromium or the like, iron or steel sheets chemically treated with chromic or phosphoric acid, and cathodically electrolyzed steel or like sheets. They may further include metal foils (such as aluminum or iron foils), plastics films (such as polyolefin, Nylon, polyester, polystyrene, polyvinilidene chloride and ethylene-vinyl acetate copolymer films) and paper and synthetic paper with composite materials (laminates) prepared by the lamination of two or more of the aforesaid materials being preferred. In the production of semi-rigid cans, there may be used a laminate of a 7–100 $\mu$m thick metal foil and an up to 400 $\mu$m thick plastics film as well as a laminate of a 7–100 $\mu$m thick metal foil, a 100–400 $\mu$m thick paper and an up to 400 $\mu$m thick plastic film.

The can materials as mentioned above, after cleaning them with Trichlene (trichloroethylene) or the like if desired, are coated with a phenolic resin, epoxy resin or polyolefin or with a modified polyolefin or the like by brushing, spraying, immersion, roll coating, electrostatic coating, electrophoretic coating, lamination or the like, whereby a coating or film may be formed on at least one side of the can materials. The coating or film may comprise one layer of the above resin or polymer or more layers of the above different resins or polymers. A primer or the like may preliminarily be coated on the can material prior to the formation of the coating thereon. Further, polyolefin films or the like are applied to at least one side of the metal can material with an adhesive since they have low adhesiveness. As the adhesive for this purpose, the adhesives used in bonding the can materials according to this invention are particularly preferred. The can materials are printable.

The modified polyolefins according to this invention are an adhesive which is a carboxyl group-containing polyolefin or a metal compound-incorporated carboxyl group-containing polyolefin. These adhesives may be used as a side seam cement or a can end cement (sealing compound) and are detailed hereinbelow.

The carboxyl group-containing polyolefins are copolymers prepared by copolymerizing an olefinic monomer such as ethylene, propylene or butene with at least one of α,β-ethylenically unsaturated carboxylic acids such as acrylic, methacrylic, itaconic, fumaric and maleic acids and maleic anhydride, or they are graft copolymers prepared by graft copolymerizing a polyolefin such as polyethylene, polypropylene, ethylene-propylene copolymer or polybutene with at least one of said α,β-ethylenically unsaturated carboxylic acids. In these copolymerization and graft copolymerization, at least one other polymerizable monomer may additionally be used if desired. The carboxyl group-containing polyolefins may also be obtained by following each of said two procedures except that the α,β-ethylenically unsaturated carboxylic acids are substituted by the esters thereof and, subsequent to the copolymerization or graft copolymerization, the ester groups are converted by saponification to the carboxyl groups. In cases where cans to be obtained in accordance with this invention are required to have heat resistance for use as retort sterilization containers or the like, it is preferred that polyolefin used in the preparation of the modified polyolefin according to this invention is a highly crystalline polyolefin such as high-density polyethylene or polypropylene. It is preferable that the amount of the α,β-ethylenically unsaturated carboxylic acid used is 0.01–50 parts by weight per 100 parts by weight of the polyolefin used.

The carboxyl group-containing polyolefins obtained are those in which about 0.01–10% by weight of the ethylenically unsaturated carboxylic acid has been copolymerized or graft copolymerized. It is desirable that the unreacted ethylenically unsaturated carboxylic acid and the like are thoroughly removed from the reaction product.

Although the carboxyl group-containing polyolefins are effective for the purpose of this invention, the following metal-incorporated modified polyolefins are preferred since they can still maintain excellent bond strength even after the retort sterilization thereof. The metal-incorporated modified polyolefins are prepared by incorporating a carboxyl group-containing polyolefin with a metal compound. The metal compounds include carbonates, sulphates, acetates, oxides and hydroxides of a member selected from the metals of Groups, I, II, III and VIII of Periodic Table, the metals being illustrated by sodium, potassium, magnesium, zinc, aluminum, copper and nickel. They further include organometallic compounds. In this case, the metal compounds in which the metal is sodium, magnesium, calcium, zinc or aluminum are preferably used for the preparation of cans for use in the fields of medical and food industries. Among the metal compounds, aluminum compounds are particularly preferable with aluminum hydroxide being more preferable. The metal compounds are used in an amount by weight of 0.05–10 parts per 100 parts by weight of the carboxyl group-containing polyolefin. The use of the metal compounds in said amount will result in giving high bond strength.

The use of less than 0.05 parts by weight of the metal compound in the preparation of a metal-incorporated carboxyl group-containing polyolefin will make somewhat decrease the resulting modified polyolefin in bond strength, while the use of more than 10 parts by weight of the metal compound will not improve the resulting modified polyolefin in bond strength and will raise problems that said modified polyolefin cannot uniformly be coated on a substrate since it foams when melted by heating.

The metal compounds may be mixed with, and dispersed in, the carboxyl group-containing polyolefin, the metal ions thereof may be coordinate bonded to the polyolefin to form a salt, or the metal ion crosslinking may be formed.

In the synthesis of the modified polyolefin, a third component such as polybutadiene may additionally be used. In this case, care should be taken to select the third component which will have no adverse effects on the adhesiveness of a modified polyolefin wherein the third component is additionally contained.

The modified polyolefins according to this invention may be produced by any one of a few methods comprising heating and mixing steps. The methods are illustrated as follows.

The carboxyl group-containing polyolefin may be obtained by such a carboxylating method as illustrated in the initial part of Example 1 to be described later.

The carboxyl group-containing polyolefin and the metal compound are heated to about 100°–220° C., preferably a temperature above the softening point of said polyolefin, and then mixed together uniformly for about 5–120 minutes. Alternatively, the polyolefin, α,β-ethylenically unsaturated carboxylic acid and metal compound may be heated and mixed together at the same time to form a graft copolymer. In some cases, a non-modified polyolefin or an excellently sanitary resin may additionally be used. In addition, the metal compound may be mixed with the other polymers usable herein at a temperature above the softening point of the polymer.

The modified polyolefins are required to be strictly sanitary in a case where they are used as the adhesive in cans for holding foodstuffs therein. Thus, they may preferably be thoroughly washed with acetone, methyl ethyl ketone, ethyl acetate or the like during or after the synthesis thereof. The modified polyolefins so washed will exhibit excellent adhesiveness and other excellent properties.

The modified polyolefins according to this invention may also be incorporated with a filler as required; the amount of the filler incorporated should be such that it does not have no adverse effects on the adhesiveness, sealability, sanitary property and the like of the modified polyolefin.

The modified polyolefins may be formed into tapes or films for use as the adhesive for application to can materials with or without a coating previously formed on at least one surface thereof. They may also be coated by the use of an extruder or the like or dispersed in an organic solvent and/or water for direct application to the can materials by the use of an extruder. In cases where the modified polyolefins are used in the tape or film form, it is preferred that the thickness of the resulting tape of film is in the range of 5–100 μm. The tapes or films having a thickness of less than 5 μm are difficult to produce, while those having a thickness of more than 100 μm are disadvantageous in that they require a large amount of heat for being melted and they cause the operational efficiency to decrease since the exude at the portions to be bonded together when heated and stain the press and the like by which they are handled, this being troublesome. In cases where the modified polyolefins are melt applied, it is preferred that the resulting layers or films thereof have a thickness of about 5-100 μm. In cases where the modified polyolefins are applied in the dispersion form, it is preferred that the particle size thereof in the dispersion is in the range of 0.5-10 μm and the viscosity of the dispersion is in the range of 10-500 seconds (Ford Cup No. 4, 25° C.).

In cases where cans are produced from can materials using the modified polyolefin in the tape or film form as the adhesive or sealing compound, the tape or film is sandwiched in between the to-be-bonded portions of the can material, the to-be-bonded portions with the adhesive or sealing compound therebetween are overlapped or lap seamed, the thus overlapped or lap seamed portions are heated by high frequency induction heating or the like and then they are cooled.

In cases where the adhesive is used in the dispersion form, it is coated uniformly on the to-be-bonded portions to a depth of 5-100 μm and is then dried at 50°-250° C. The to-be-bonded portions so coated and dried are overlapped or lap seamed, after which either the whole of the can or only the to-be-bonded portions are heated by high frequency induction heating or the like and then cooled. In order to prevent the bonded portions from peeling from each other, it is preferable that they are contacted with water immediately after said heating or they are hammered with a metal body cooled by a refrigerant to be cooled rapidly to below 100° C. The expression "The to-be-bonded portions of can materials are bonded together" used herein means side bonding or seaming (can body making), top bonding or seaming (bonding together of can body and can cover) and/or bottom bonding or seaming (bonding together of can body and can bottom) with aid of a side seam cement or can end cement in the production of cans. In these bonding or seaming steps, the modified polyolefins according to this invention are used as the adhesive between the can materials. Further, in cases where the adhesive according to this invention is attempted to be used as the sealing compound between a can body and a mating cover or bottom, said can body may be a soldered one.

In cans or the like having a can body the bonded portions of which are lap seamed, there is raised a problem as to compression resistance and impact resistance, particularly as to destruction of the bonded portions of the cans. Thus, the modified polyolefin used in not necessarily sufficiently strong as the adhesive. To solve said problem, a mixture of the modified polyolefin with a non-modified polyolefin may be used. The blending ratio by weight between the modified and non-modified polyolefins may vary from 10-95 to 90-5. A mixture of the modified polyolefin and polyamide may give good results. In addition to said mixed adhesives, the following laminated adhesives may also solve the aforesaid problems. The laminated adhesives include modified polyolefin/polyolefin, modified polyolefin/polyolefin/-modified polyolefin, modified polyolefin/polyamide and modified polyolefin/polyamide/modified polyolefin laminated adhesives. They may be obtained by a co-extrusion method, an extrusion coating method, a films lamination method, or the like. Further, the to-be-bonded portions of can materials may be covered or coated respectively with tapes or coating materials made of different adhesives and then bonded together thereby resulting in the formation of a laminated adhesive. Still further, the modified polyolefin layer of a laminated adhesive may be one made of a mixture of the modified polyolefin and non-modified polyolefin.

Can bodies and mating can covers (lids) are bonded together by seaming thereby to produce rigid cans; in this case, the adhesive according to this invention may be effectively used as a sealing compound. In the production of semi-rigid cans, can bodies and mating covers are bonded together (lap seam) by hot pressing with the use of the adhesive according to this invention. The can covers may be made of a metal foil, a metal sheet, a plastic film or paper including a synthetic paper. In cases where the can covers are coated at the innermost side with the modified polyolefin as the adhesive according to this invention, the can bodies and the thus coated can covers may be bonded together without the use of an adhesive or sealing compound.

BRIEF DESCRIPTION OF THE DRAWINGS

In the accompanying drawing.

Figure 2:
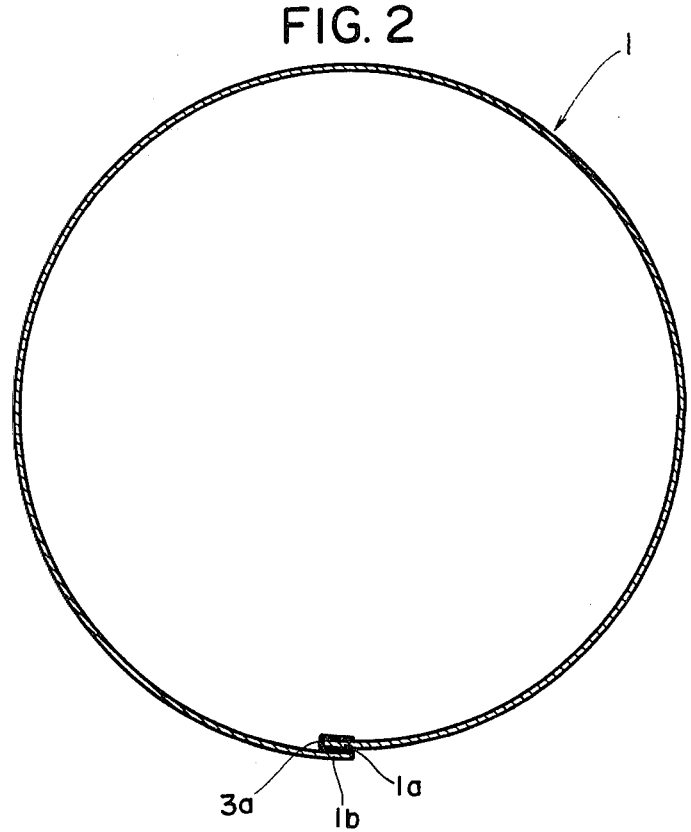
FIG. 2 is a cross-sectional view in magnified form taken on the line A—A of FIG. 1.

As is seen from FIG. 2, the to-be-bonded portions 1a and 1b of a can body blank 1 may be bonded together only be sandwiching the modified polyolefin tape 3a in between said portions and then hot pressing the whole according to this invention, whereby a can body is obtained. In addition, as is seen from FIG. 4, a can cover 2 or bottom 4 with its innermost layer being an adhesive layer 3b may be bonded directly to a mating can body. In these cases, the adhesive tape or the adhesive layer may be substituted by a sealing compound consisting of the modified polyolefin. Further, these bonding together may alternatively be achieved by a conventional hook seaming method using the modified polyolefin as the adhesive tape or sealing compound.

Can bodies may also be obtained by curling the can body blank according to this invention so that the end portions thereof are overlapped with the adhesive layers of the portions facing to each other and then hot pressing said overlapped portions.

This invention will be better understood by the following Examples wherein all parts are by weight unless otherwise specified.

EXAMPLE 1

One hundred (100) parts of polypropylene (M.I. 10), 20 parts of maleic anhydride and 375 parts of xylene were charged into a reactor provided with an inlet for nitrogen gas, a thermometer and an agitator, to form a mixture which was heated to 130° C. with agitation in a nitrogen gas atmosphere. The mixture so heated was incorporated dropwise with a solution of 0.1 part of benzoyl peroxide in 40 parts of xylene over a time period of 90 minutes, after which the whole was heated to 130° C. under agitation for 60 minutes and then cooled to room temperature in 60 minutes. The suspension thus obtained was filtered to remove the xylene therefrom and washed repeatedly with methyl ethyl ketone to an extent that hardly any of the maleic anhydride and reaction products thereof only were appreciated in the methyl ethyl ketone by liquid chromatography. One hundred (100) parts of powdery polypropylene-maleic anhydride graft copolymer resin (maleic anhydride graft ratio: 0.6%) were air dried, incorporated with one part of aluminum hydroxide, melt mixed together at 180° C. in an extruder and then extruded by the extruder to obtain a modified polyolefin in the pellet form. The pellets so obtained were further extruded by an extruder (T die temperature, 240° C.; resin temperature, 210° C.) to obtain a 50 μm thick film which was then cut into tapes of 13 mm in width. The thus obtained tapes were applied to the following 12 kinds [(A-1)–(A-6) and (B-1)–(B-6)] of can materials to obtain can bodies.

(A-1) Polypropylene film (70 μm)/modified polyolefin (10 μm)/aluminum foil (15 μm)/modified polyolefin (5 μm)/Nylon 11 film (70 μm)

The polypropylene film and the aluminum foil were overlapped with the modified polyolefin being sandwiched in therebetween, after which the whole was hot pressed at 200° C. for 1.5 seconds to obtain a laminate. The modified polyolefin/Nylon 11 which was a co-extruded film, was hot pressed against the aluminum foil side of the thus obtained laminate at 200° C. for 1.5 seconds by the use of a hot press treated on the surface with Teflon thereby to obtain a desired final laminate.

(A-2) Polypropylene film (70 μm)/modified polyolefin (10 μm)/aluminum foil (15 μm)/polyurethane adhesive (5 μm)/polyester film (100 μm)/polyurethane adhesive (5 μm)/polypropylene film (40 μm)

(A-3) Polypropylene film (70 μm)/modified polyolefin (10 μm)/aluminum foil (15 μm)/polyurethane adhesive (5 μm)/synthetic paper (110 μm)/polyurethane adhesive (5 μm)/Nylon 12 film (40 μm)

The synthetic paper used was one produced under the trademark of YUPO by Ohji Yuka Goseishi Co., Ltd.

(A-4) Polypropylene film (150 μm)/modified polyolefin (10 μm)/aluminum foil (80 μm)/epoxy-phenol resin coating (5 μm)

The aluminum foil was coated with the epoxy-phenol resin and the thus coated aluminum foil was then laminated with the polypropylene film with the modified polyolefin being sandwiched in therebetween.

(A-5) Nylon 11 film (150 μm)/modified polyolefin (10 μm)/aluminum foil (80 μm)/epoxy-urea resin coating (5 μm)

(A-6) Polypropylene film (150 μm)/polyurethane adhesive (5 μm)/aluminum foil (80 μm)/acryl-melamine resin coating (5 μm)

(B-1)–(B-6)

Can materials (B-1) to (B-6) were prepared by following the procedures of (A-1) to (A-6) except that a 55 μm thick iron foil was substituted for the aluminum foil, respectively.

Figure 1:
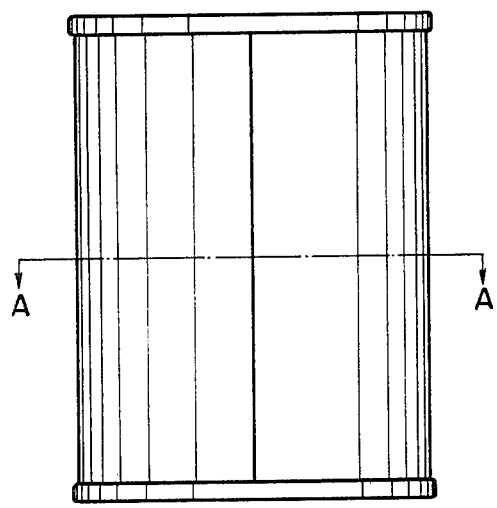
FIG. 1 is a side view of a can.

In each of 12 kinds of the laminates (can materials) (A-1) to (A-6) and (B-1) to (B-6), a previously bent or folded adhesive tape was mounted on one end of the to-be-bonded portions of the laminate, the one end being to form a part of the inner side of the resulting can body, in such a manner that the folded tape embraces the one end. Thereafter, the to-be-bonded portions with said one end thereof being embraced by the folded tape were overlapped as shown in FIGS. 1 and 2, heated by high frequency induction heating and then cooled to obtain can bodies.

The bonded portions of each of the can bodies so obtained were subjected to a 1 cm wide, 90° peel test (peel speed: 200 mm/min.). The can bodies were immersed in water at 120° C. for two hours, in an aqueous ethanol solution at 65° C. for two hours and in a 5% aqueous sodium chloride solution for two hours respectively, after which the bonded portions of the can bodies so treated were measured for peel strength with the results being shown in Table 1.

Figure 3:
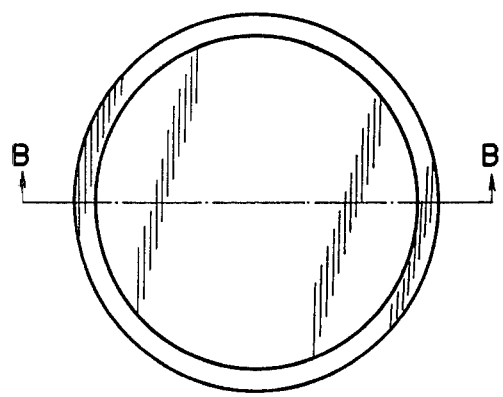
FIG. 3 is a top view of the of FIG. 1
Figure 4:
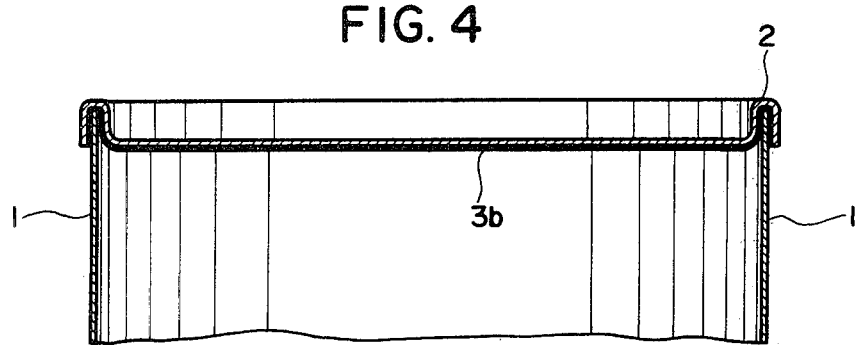
FIG. 4 is a cross-sectional view in magnified form taken on the line B—B of FIG. 3.

Further, a 150 μm thick aluminum sheet or a 55 μm thick iron foil, on one side of each of which was coated with an epoxy-phenol resin to a thickness of 5 μm, was melt coated on the other side with the modified polyolefin of Example 1 to a thickness of 50 μm by using an extruder and said polyolefin in the pellet form and then heat treated at 200° C. for two seconds thereby to obtain a laminate which was press formed to obtain can covers and bottoms with the modified polyolefin-coated side being to be bonded with the can bodies. The can covers and bottoms so obtained were bonded to the aforesaid various can bodies respectively by the use of a hot press as shown in FIGS. 3 and 4, thereby to obtain cans.

TABLE 1

| Laminate (Can material) | Peel strength (Kg/cm) | Peel strength after retort sterilization (Kg/cm) | | | |
|---|---|---|---|---|---|
| | | Water (120° C., 2 hrs) | 8% aqueous ethanol solution (65° C., 2 hrs) | 3% aqueous acetic acid solution (100° C., 2 hrs) | 5% aqueous sodium chloride solution (120° C., 2 hrs) |
| A-1 | 2.0 | 1.8 | 1.9 | 1.6 | 1.8 |
| A-2 | 1.9 | 1.9 | 1.6 | 1.7 | 1.6 |
| A-3 | 0.9 (*) | 0.9 (*) | 0.8 (*) | 0.8 (*) | 0.9 (*) |
| A-4 | 1.9 | 1.7 | 1.7 | 1.5 | 1.9 |
| A-5 | 1.7 | 1.6 | 1.8 | 1.5 | 1.8 |
| A-6 | 1.6 (Peel caused between film and aluminum foil) | — | — | — | — |
| B-1 | 1.7 | 1.9 | 1.6 | 1.4 | 1.8 |
| B-2 | 2.0 | 2.1 | 1.7 | 1.7 | 1.7 |
| B-3 | 0.9 (*) | 0.9 (*) | 0.9 (*) | 0.9 (*) | 0.8 (*) |
| B-4 | 1.8 | 1.9 | 1.8 | 1.6 | 1.8 |
| B-5 | 1.9 | 1.9 | 1.7 | 1.7 | 1.7 |
| B-6 | 1.5 (Peel caused between film and iron foil) | — | — | — | — |

(*): The synthetic paper itself caused interlayer peel.

EXAMPLE 2

There were used the laminate (A-1) of Example 1 as the can material and each of the following compounds (a) to (e) as the modified polyolefin:
(a) maleic anhydride-graft polypropylene (NO aluminum hydroxide contained)
(b) a mixture containing 100 parts of maleic anhydride-graft polypropylene and 1 part of zinc acetate
(c) ethylene-acrylic acid copolymer (acrylic acid: 5 wt.%)
(d) HI-MILAN (ethylene-acrylic acid copolymer type ionomer produced by Mitsui Polychemical Col., Ltd.)
(e) a mixture containing 60 parts of the modified polyolefin of Example 1 and 40 parts of polypropylene
to obtain can bodies which were tested as in Example 1. It should be noted that in a case where each of the modified polyolefins (c) and (d) were used, the laminate used together therewith was identical with (A-1) except that a high-density polyethylene film was substituted for the polypropylene film. The test results are shown in Table 2.

TABLE 2

| Adhesive | Peel strength (Kg/cm) | Peel strength after retort sterilization (Kg/cm) | | | |
|---|---|---|---|---|---|
| | | Water (120° C., 2 hrs) | 8% aqueous ethanol solution (65° C., 2 hrs) | 3% aqueous acetic acid solution (100° C., 2 hrs) | 5% aqueous sodium chloride solution (120° C., 2 hrs) |
| (a) | 1.9 | 1.7 | 1.6 | 1.6 | 1.7 |
| (b) | 1.8 | 1.7 | 1.5 | 1.4 | 1.6 |
| (c) | 1.4 | 1.3 | 1.3 | 1.1 | 1.2 |
| (d) | 1.5 | 1.2 | 1.4 | 1.2 | 1.1 |
| (e) | 2.0 | 1.6 | 1.6 | 1.5 | 1.7 |

COMPARATIVE EXAMPLE 1

The procedure of Example 1 was followed except that the laminates (A-1), (A-3) and (A-5) were used as the can materials and a 50 μm thick polypropylene tape or a 50 μm thick Nylon 12 tape were substituted for the modified polyolefin adhesive, in an attempt to obtain can bodies. However, the to-be-bonded portions of any of the laminates were not bonded together.

EXAMPLE 3

The procedure of Example 1 was followed except that the laminate (A-4) was used as the can material, to obtain a can body with the polypropylene layer being the innermost layer thereof. A can bottom was obtained by punching the same laminate of modified polyolefin (50 μm)/aluminum foil (150 μm)/epoxy-phenol resin coating (5 μm) as used in Example 1. The thus obtained can body and bottom were contacted with each other with the modified polyolefin layer of the bottom facing to the can body and then hot pressed together under high frequency induction heating as shown in FIG. 4 thereby to obtain an open top can. The thus obtained open top can was filled up with water, provided with a can cover in the same manner as the bottom and exposed to 120° C. for two hours. The water so treated was measured for the amount of potassium permanganate consumed in accordance with Notice No. 434 (Oct. 4, 1966) of the Japanese Welfare Ministry with the result that the amount was 0.21 ppm which was much less than the permitted limit of 10 ppm.

EXAMPLE 4

The pellets obtained in Example 1 were dissolved under heat in xylene to obtain a solution containing 10% of non-volatile matter, soon after which the solution so obtained was added dropwise to methyl isobutyl ketone the volume of which was three times that of said solution. The whole was cooled and then decanted to separate the sedimentary layer thereby to prepare a 30% dispersion of the non-volatile matter in the organic solvent.

In the preparation of 18-liter cans from a laminate of 320 μm thick tin-plate sheet, a 70 μm thick polypropylene film attached to one side thereof with a polyurethane adhesive and an epoxy-phenol resin coating formed on the other side, said coated metal sheet was cut to obtain sheet pieces having their respective predetermined dimensions necessary for preparing the 18-liter can, the thus obtained sheet pieces were press formed, and the aforesaid modified polyolefin dispersion in the organic solvent was spray coated on the to-be-bonded portions of the thus press formed sheet pieces respectively for a can body, cover and bottom and heated to 180° C. for 30 seconds. Thereafter, the to-be-bonded portions were seamed by a seamer, the whole was heated to 200° C. for 60 seconds and then cooled to obtain a 18-liter can the cover of which was then provided with an opening for supplying or withdrawing a material therethrough. Some of the thus obtained 18-liter cans were filled with air, sealed at the opening and then subjected to a leak test and a compression resistance test in accordance with JIS (Japanese Industrial Standard)-Z-1602-6 with the result that the can exhibited no changes. In addition, the other open top cans were filled with a 10% sulphuric acid solution, sealed with a can cover with the aid of the sealing compound and kept at 40° C. for 3 months with the result that neither the corrosion of the metal nor the leakage of the contents was appreciated.

EXAMPLE 5

The modified polyolefin tape of Example 1 was placed and melt coated on the grooves of the can cover and bottom, obtained from a 320 μm thick tin-plate sheet, for an 18-liter can at 200° C. for 15 seconds, after which the thus coated cover and bottom and a corresponding solder sealed can body were seamed together, heated to 180° C. for 30 seconds and cooled to obtain an 18-liter can.

The thus obtained can was tested for leakage and compression resistance with the result that no changes were appreciated.

EXAMPLE 6

(C-1) Polypropylene film (70 μm)/modified polyolefin of Example 1 (10 μm)/tin-plate sheet (230 μm)/epoxy-phenol resin coating (5 μm)

The tin-plate sheet was coated with the epoxy-phenol resin and covered on the non-coated side with a polypropylene/modified polyolefin co-extruded film by hot pressing.

(C-2) Epoxy-phenol resin coating (5 μm)/tin-free steel sheet (230 μm)/epoxy-urea resin coating (5 μm)

(C-3) Polypropylene film (70 μm)/modified polyolefin of Example 1 (10 μm)/aluminum sheet (350 μm)

The modified polyolefin tape of Example 1 was sandwiched in between the to-be-bonded portions of each of the can materials, that is the laminates (C-1), (C-2) and (C-3), after which the to-be-bonded portions having the tape therebetween were heated by high frequency induction heating and then cooled to obtain a can body. The can bodies so obtained were tested as in Example 1 with the results being shown in Table 3. The can bodies so obtained by side seaming were subjected to can making working such as flange making and can cover and bottom seaming to obtain cans. The can covers and bottoms to be used were a laminate of epoxy-phenol resin coating (5 μm)/tin-plate sheet (230 μm), tin-free steel sheet (230 μm) or aluminum sheet (170 μm)/modified polyolefin of Example 1 (50 μm).

made on cans prepared by following the above-mentioned procedure except that the modified polyolefin of Example 1 was used as the adhesive in the preparation of can bodies and the organic solvent dispersion (the dispersion of the modified polyolefin of Example 1) of Example 4 was used as the sealing compound in the bonding of the bottom to the can body.

TABLE 4

| Adhesive | Peel strength soon after retort sterilization (Kg/cm) | Peel strength after preservation test (Kg/cm) |
| --- | --- | --- |
| (a) | 7.4 | 0.8 |
| (b) | 7.1 | 1.1 |
| (c) | 2.0 | 0.3 |
| (d) | 2.3 | 0.5 |
| (e) | 7.5 | 1.1 |
| Example 1 | 7.2 | 1.5 |

In the test for post-retort peel strength, all the samples caused cohesion destruction; on the other hand, in the aging test at 66° C. for two weeks, all the samples caused interlayer peel between the aluminum sheet and

TABLE 3

| Laminate (Can material) | Peel strength (Kg/cm) | Peel strength after retort sterilization (Kg/cm) | | | |
| --- | --- | --- | --- | --- | --- |
| | | Water (120° C., 2 hrs) | 8% aqueous ethanol solution (65° C., 2 hrs) | 3% aqueous acetic acid solution (100° C., 2 hrs) | 5% aqueous sodium chloride solution (120° C., 2 hrs) |
| (C-1) | 8.2 | 8.3 | 8.1 | 7.6 | 8.3 |
| (C-2) | 4.9 | 4.8 | 4.9 | 4.4 | 4.5 |
| (C-3) | 7.4 | 7.1 | 7.5 | 7.0 | 7.4 |

EXAMPLE 7

The laminate (C-1) of Example 6 as the can body blank, and each of the modified polyolefins (a), (b) and (e) of Example 2 as the side seam cements, were used in the preparation of can bodies. In addition, a laminate which was the same as the laminate (C-1) except that a high-density polyethylene film was substituted for the polypropylene film, was used as the can body blank simultaneously with using the modified polyolefin (c) and (d) as the adhesive in the preparation of can bodies. The thus obtained can bodies were provided with a bottom of an epoxy-phenol resin coating (5 μm)/aluminum sheet (170 μm)/epoxy-phenol resin coating (5 μm) laminate by coating each of dispersions of (a) to (e) in an organic solvent (the dispersions being prepared in accordance with the dispersion preparing method indicated in Example 4) on the to-be-bonded portions of the bottom and then seaming the can body and bottom together thereby to obtain open top cans. The open top cans so obtained were filled with a mixed condiment comprising soy, soybean oil, apple puree, bean paste, rice wine (sake), sugar and spice such as garlic, provided with a can cover by seaming as in the bottom, subjected to retort sterilization at 125° C. for 30 minutes, preserved at 66° C. for two weeks and then tested at the side seam (the bonded portions of the can body) for bond strength. The same test as above was polypropylene film with the adhesive tape and polypropylene film (or polyethylene film) being still bonded together. It is apparent from Table 4 that the modified polyolefin of Example 1 is superior.

EXAMPLE 8

The pellets obtained in Example 1 were dissolved under heat in xylene so as to obtain a 10% xylene solution of the non-volatile matter, after which the solution so obtained was added dropwise to methyl isobutyl ketone the volume of which was three times that of the solution. The whole was cooled, decanted to separate the sedimentary layer therefrom thereby obtaining a 30% dispersion of the non-volatile matter.

The dispersion so obtained was spray coated on the to-be-bonded portions of the laminate (can material) (C-2) of Example 6, baked and dried at 180° C. for 30 seconds, heated by high frequency heating and then cooled to obtain a can body which was tested for peel strength and post-retort peel strength as in Example 1. The result is shown in Table 5.

TABLE 5

| | Peel strength (Kg/cm) | Post-retort peel strength (Kg/cm) | | | |
| --- | --- | --- | --- | --- | --- |
| | | Water (120° C., 2 hrs) | 8% aqueous ethanol solution (65° C., 2 hrs) | 3% aqueous acetic acid solution (100° C., 2 hrs) | 5% aqueous sodium chloride solution (120° C., 2 hrs) |
| (C-2) | 4.7 | 4.9 | 4.9 | 4.4 | 4.8 |

COMPARATIVE EXAMPLE 2

The procedure of Example 6 was followed except that a Nylon 12 tape was substituted by the modified polyolefin tape. The result was that the to-be-bonded portions of (C-1) to (C-3) were not bonded together.

EXAMPLE 9

Fifty (50) parts of the maleic anhydride-graft polypropylene of Example 1 and 50 parts of Nylon 11 were melt blended together and pelletized by the use of an extruder. The pellets so obtained were formed to tapes, 50 μm thick × 13 mm wide.

There were obtained can bodies by using each of (A-1), (A-2), (A-3), (A-4), (C-1) and (C-3) as the can material and also using the thus formed tape as the adhesive. The can bodies so obtained were tested for pre-retort and post-retort peel strength with the results being indicated in Table 6.

Can bodies were prepared from each of the laminates (A-b 1), (A-2) and (A-3) as well as said adhesive tape. The thus obtained can bodies were provided with a can cover made of a modified polyolefin (50 μm)/aluminum foil (150 μm)/epoxy-phenol resin coating (5 μm) laminate by seaming the can body and cover under pressure and high frequency induction heating as shown in FIG. 4. The thus obtained open top cans were each filled with water at 95° C., sealed with a can cover by top seaming, maintained at −5° C. and dropped at a height of 1.2 meter with the results that the leakage ratios for the cans (A-1), (A-2) and (A-3) were 3%, 3% and 2%, respectively. The leakage ratio may be expressed by the following formula:

$$\frac{\text{No. of cans which caused leakage after dropped}}{\text{No. of cans dropped}} \times 100\%.$$

TABLE 6

| Laminate (Can material) | Peel strength (Kg/cm) | Post-retort peel strength (Kg/cm) | | | |
|---|---|---|---|---|---|
| | | Water (120° C., 2 hrs) | 8% aqueous ethanol solution (65° C., 2 hrs) | 3% aqueous acetic acid solution (100° C., 2 hrs) | 5% aqueous sodium chloride solution (120° C., 2 hrs) |
| (A-1) | 1.8 | 1.8 | 2.0 | 1.6 | 1.7 |
| (A-2) | 1.6 | 1.8 | 1.7 | 1.5 | 1.8 |
| (A-3) | 0.8 (*) | 0.7 (*) | 0.8 (*) | 0.8 (*) | 0.7 (*) |
| (A-4) | 4.6 | 4.7 | 4.4 | 4.4 | 4.8 |
| (C-1) | 6.5 | 6.8 | 6.5 | 6.4 | 6.8 |
| (C-3) | 6.2 | 6.3 | 6.2 | 5.8 | 6.1 |

(*): Synthetic paper itself caused interlayer separation.

EXAMPLE 10

Ninety (90) parts of the modified polyolefin of Example 1 and 10 parts of polyethylene were melt blended together and pelletized.

The pellets so obtained were formed to 50 μm thick tapes. There were prepared can bodies from a laminate of polypropylene film (70 μm)/polyurethane adhesive (about 5 μm)/aluminum foil (40 μm)/polyurethane adhesive (about 5 μm)/Nylon 12 film (150 μm) as the can material as well as the aforesaid tape as the adhesive. The thus prepared can bodies had a bond strength of 2.2 Kg/cm. Further, they were filled with water at 95° C., sealed with a can cover and bottom each made of a modified polyolefin of Example 1 (50 μm)/aluminum foil (150 μm)/epoxy-phenol resin coating (5 μm) laminate in the same manner as in Example 9 and then subjected to the leakage test as previously defined. The result is that the leakage ratio was 2%.

EXAMPLE 11

There were obtained can bodies by bonding together the to-be-bonded portions of each of the can materials (A-1), (C-1) and (C-2) with aid of an adhesive film as previously mentioned in Example 1, the adhesive film being a co-extruded film consisting of the modified polyolefin (10 μm) and polypropylene film (40 μm) of Example 1. In the can bodies so obtained, the can material and adhesive film were overlapped so that the polypropylene film side of the former faced to the polypropylene side of the latter. The test was made as in Example 1 and the results are indicated in Table 7.

TABLE 7

| Laminate (Can material) | Peel strength (Kg/cm) | Post-retort peel strength (Kg/cm) | | | |
|---|---|---|---|---|---|
| | | Water (120° C., 2 hrs) | 8% aqueous ethanol solution (65° C., 2 hrs) | 3% aqueous acetic acid solution (100° C., 2 hrs) | 5% aqueous sodium chloride solution (120° C., 2 hrs) |
| (A-1) | 3.3 | 3.5 | 3.0 | 2.9 | 3.3 |
| (C-1) | 9.4 | 9.2 | 9.4 | 9.1 | 9.3 |
| (C-2) | 9.5 | 9.6 | 9.3 | 9.1 | 9.4 |

EXAMPLE 12

In the same manner as in Example 1, there were obtained can bodies from each of the can materials (A-4), (A-5), (C-1) and (C-2) as well as a co-extruded film consisting of a modified polyolefin of Example 1 (5 μm)/Nylon 11 (40 μm)/modified polyolefin of Example 1 (5 μm) as the adhesive. The thus obtained can bodies were immersed respectively in the fluids shown in Table 8 and tested for the initial and post-retort peel strengths in the same manner as in Example 1. The test results are shown in Table 8. The leakage ratios for cans prepared from can body blanks (A-4) and (A-5) and can covers made of a modified polyolefin (50 μm) of Example 1/aluminum foil (150 μm)/epoxy-phenol resin coating (5 μm) in the same manner as in Example 9, were also measured and are shown in Table 8.

For comparison, cans prepared from each of can materials (A-4) and (A-5 ) as well as the modified polyolefin (50 μm) of Example 1 as the adhesive exhibited leakage ratios of 7–8% which are undesirably high as compared with cases where said co-extruded film was used as the adhesive.

TABLE 8

| Laminate (Can material) | Peel strength (Kg/cm) | Post-retort peel strength (Kg/cm) | | | | Leakage ratio |
|---|---|---|---|---|---|---|
| | | Water (120° C., 2 hrs) | 8% aqueous ethanol solution (65° C., 2 hrs) | 3% aqueous acetic acid solution (120° C., 2 hrs) | 5% aqueous sodium chloride solution (120° C., 2 hrs) | |
| (A-4) | 3.1 | 3.0 | 2.5 | 2.7 | 3.0 | 4% |
| (A-5) | 2.9 | 3.1 | 3.0 | 2.8 | 2.9 | 3% |
| (C-1) | 9.7 | 9.5 | 9.7 | 9.4 | 9.6 | — |
| (C-2) | 9.8 | 9.9 | 9.6 | 9.4 | 9.7 | — |

What is claimed is:

1. Cans prepared by bonding and/or seaming together the to-be-bonded portions of can materials with the aid of an adhesive inserted between said portions, wherein the adhesive consists of (1) at least one member selected from the group consisting of modified polyolefins which are carboxyl group-containing polyolefins and metal compound-incorporated carboxyl group-containing polyolefins and (2) a member selected from the group consisting of non-modified polyolefins and polyamides, and said adhesive is used in the form of a tape or coating material.

2. Cans according to claim 1 wherein the metal compound-incorporated carboxyl group-containing polyolefins contains 0.05-10 parts by weight of the metal compound per 100 parts by weight of the carboxyl group-containing polyolefin.

3. Cans according to claim 1, wherein the modified polyolefin is a member selected from the group consisting of olefin-ethylenically unsaturated carboxylic acid copolymers, metal compound-incorporated olefin-ethylenically unsaturated carboxylic acid copolymers, polyolefin-ethylenically unsaturated carboxylic acid-graft copolymers and metal compound-incorporated polyolefin-ethylenically unsaturated carboxylic acid-graft copolymers, the metal compound-incorporated olefin-ethylenically unsaturated carboxylic acid copolymers and the metal compound-incorporated polyolefin-ethylenically unsaturated carboxylic acid-graft copolymers containing 0.05-10 parts by weight of the metal compound per 100 parts by weight of the olefin-ethylenically unsaturated carboxylic acid copolymer and of the polyolefin-ethylenically unsaturated carboxylic acid-graft copolymer, respectively.

4. Cans according to claim 1 wherein the metal compound is a compound of the metal selected from the group consisting of Groups I, II, III and VIII metals of the Periodic Table.

5. Cans according to claim 4, wherein the metal compound is incorporated in the polymer at a temperature above the softening point of the polymer.

6. Cans according to claim 1 wherein the can materials are a laminate of a 7-100 μm thick metal foil and an up to 400 μm thick plastic film.

7. Cans according to claim 6, wherein the can materials are a laminate of a metal foil and a polyolefin film.

8. Cans according to claim 6, wherein the can materials are a laminate of a polyolefin film, a metal foil and a polyolefin film.

9. Cans according to claim 6, wherein the film and the foil are bonded together with an adhesive consisting of said at least one modified polyolefin.

10. Cans according to claim 6, wherein the can materials are a laminate of a 7-100 μm thick metal foil, a 100-400 μm thick paper and an up to 400 μm thick plastic film.

11. Cans prepared by bonding and/or seaming together the to-be-bonded portions of can materials with the aid of an adhesive, wherein the adhesive comprises at least one modified polyolefin which is a metal compound-incorporated carboxyl group-containing polyolefin and said adhesive is a laminate form comprising a layer of said modified polyolefin and a layer of polyolefin, said metal compound being a compound of a metal selected from the group consisting of Groups I, II, III and VIII metals of the Periodic Table.

12. Cans according to claim 11, wherein said laminate form further comprises a second modified polyolefin layer.

13. Cans prepared by bonding and/or seaming together the to-be-bonded portions of can materials with the aid of an adhesive, wherein the adhesive comprises at least one modified polyolefin which is a metal compound-incorporated carboxyl group-containing polyolefin and said adhesive is in a laminate form comprising a layer of said modified polyolefin and a layer of polyamide, said metal compound being a compound of a metal selected from the group consisting of Groups I, II, III and VIII metals of the Periodic Table.

14. Cans according to claim 13, wherein said laminate form further comprises a second modified polyolefin layer.

15. Cans prepared by bonding and/or seaming together the to-be-bonded portions of can materials with the aid of an adhesive, wherein the adhesive comprises a metal compound-incorporated carboxyl group containing polyolefin, said metal compound being a compound of a metal selected from the group consisting of Groups I, II, III and VIII metals of the Periodic Table.

* * * * *